(12) United States Patent
Conforti

(10) Patent No.: US 6,895,672 B2
(45) Date of Patent: May 24, 2005

(54) KITCHEN UTENSIL

(76) Inventor: Terry J. Conforti, 1821 NE. 40th Ct., #308, Pompano Beach, FL (US) 33064

( * ) Notice: Subject to any disclaimer, the term of this patent is extended or adjusted under 35 U.S.C. 154(b) by 0 days.

(21) Appl. No.: 10/641,664

(22) Filed: Aug. 15, 2003

(65) Prior Publication Data

US 2005/0034310 A1 Feb. 17, 2005

(51) Int. Cl.$^7$ ................................................ A47F 13/08
(52) U.S. Cl. ......................... 30/169; 15/236.01; 294/55
(58) Field of Search ........................... 30/324, 340, 169, 30/171, 148–150, 136, 691; 210/470; 73/426; D7/645, 647, 667, 691, 692; D10/46.2; 294/55; 15/236.01

(56) References Cited

U.S. PATENT DOCUMENTS

| | | | | |
|---|---|---|---|---|
| 1,057,269 A | * | 3/1913 | Prestien ..................... | 210/470 |
| 1,357,629 A | * | 11/1920 | Faistl et al. ................. | 222/572 |
| 2,280,225 A | * | 4/1942 | Finely ........................ | 15/245 |
| 2,799,086 A | * | 7/1957 | Tupper ....................... | 30/324 |
| 2,807,168 A | * | 9/1957 | Wipf .......................... | 73/427 |
| 3,627,128 A | * | 12/1971 | Ostrowsky .................. | D7/668 |
| 4,616,867 A | * | 10/1986 | O'Hara ...................... | 294/55 |
| 4,627,128 A | * | 12/1986 | Shea .......................... | 294/55 |
| 5,199,349 A | * | 4/1993 | Hansen ....................... | 210/470 |
| 2003/0189346 A1 | * | 10/2003 | Leydens et al. ............. | 294/5.5 |

* cited by examiner

Primary Examiner—Stephen Choi
(74) Attorney, Agent, or Firm—Robert M. Downey, PA

(57) ABSTRACT

A utensil for scooping, scraping, measuring, pouring and serving includes a main body having a generally flat bottom and side walls extending up from the bottom to a top edge in surrounding relation to an interior reservoir. The top edge is preferably tapered in thickness to provide a scraping blade which generally conforms to and seals against the surface of a bowl, dish, pan or the like to thoroughly scrape and remove a substance therefrom. A pour spout formed with a non-drip lip extends from one of the side walls, along the top edge, and allows the scooped substance to be easily poured into a storage container without spilling the substance. A handle extends from the main body and, in a preferred embodiment, is offset towards the pour spout side to reduce the likelihood of contact of the user's fingers with the substance when the top edge opposite of the spout is used to scrape and scoop the substance. The device may be made to include a range of sizes, according to units of measure, with smaller utensils nesting within larger ones in a stacked array for storage purposes.

6 Claims, 4 Drawing Sheets

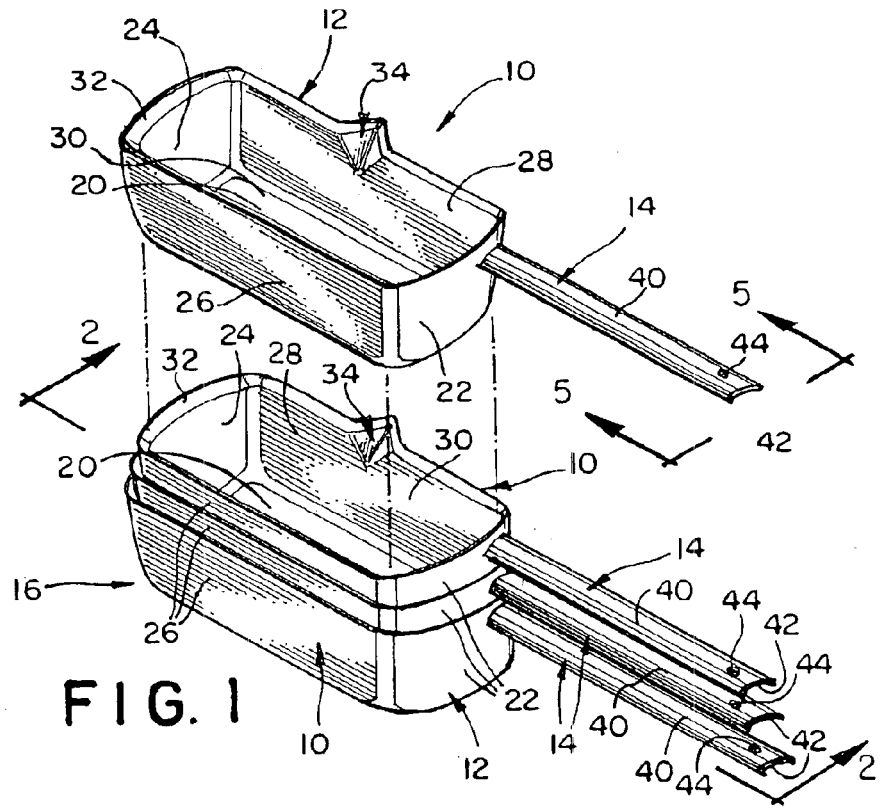
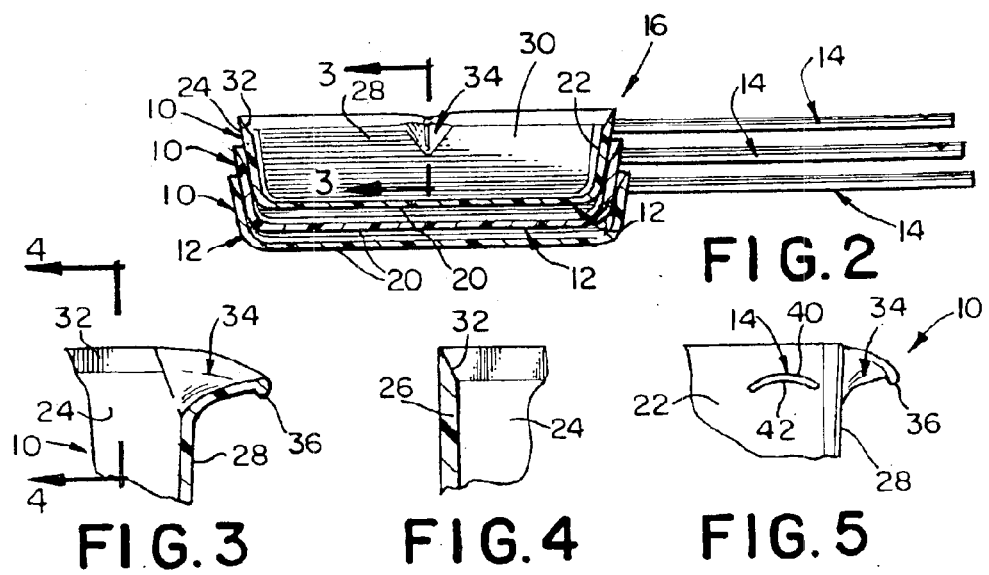
FIG. 1
FIG. 2
FIG. 3
FIG. 4
FIG. 5

KITCHEN UTENSIL

BACKGROUND OF THE INVENTION

1. Field of the Invention

The present invention relates to utensils for scooping and pouring substances and, more particularly, to a kitchen utensil having a scoop portion and an elongate handle, and wherein the scoop portion is structured for scooping, scraping, measuring, pouring and serving food substances such as condiments, sauces, salad dressing, gravy and the like. The utensil is particularly useful for scraping and scooping substances from bowls, dishes, pans and the like in order to salvage residual which can be easily poured through the narrow opening of a small mouth bottle or other container for storage and subsequent use.

2. Discussion of the Related Art

In the preparation and serving of appetizers, main entrees and desserts, the food products used in the recipes for these dishes are removed from their original packaging. For instance, various condiments, dressings, sauces and other liquids, as well as granular or powder substances (e.g. sugar, flour, salt, etc.) are removed from their original packaging and placed into bowls, dishes, pans, etc. in the process of preparation and serving of various recipe dishes. In many instances, the dispensed food product is not entirely consumed and it is possible to salvage the remaining portion for subsequent use. However, the use of conventional utensils such as spoons or ladles to scoop and remove the substance from the serving dish or cooking pan is not always practical or effective. Moreover, it can be extremely difficult to return the substance to its original container, particularly when the original container has a small or narrow opening. For example, condiments and salad dressings are often packaged in bottles which have a narrow neck with a small mouth or opening at the top. In this instance, pouring the substance back into its original container without spilling the substance down the outside of the container is virtually impossible when using a conventional utensil, unless a separate funnel is positioned through the open mouth of the container.

Accordingly, there remains a need for a specifically designed kitchen utensil which is adapted for scraping and scooping substances, such as sauces, salad dressing, condiments and the like, from the surfaces of a serving dish or cooking pan and, wherein the utensil is further structured to facilitate easy pouring of the substance into either large or small mouthed containers without spilling the substance.

OBJECTS AND ADVANTAGES OF THE INVENTION

With the foregoing in mind, it is a primary object of the present invention to provide a utensil which is particularly adapted for scooping, scraping, measuring, pouring and serving any of a variety of liquid and dry granular substances.

It is a further object of the present invention to provide a kitchen utensil which includes a scoop portion and an elongate handle, and wherein the scoop portion is provided with one or more scraping edges that conforms to the surface contour of a bowl, dish, cooking pan or the like to effectively and efficiently remove a substance from the surface.

It is still a further object of the present invention to provide a kitchen utensil which is specifically adapted for scraping and removing food substances from the surfaces of bowls, dishes, cooking pans and the like, and further wherein the utensil is structured to collect the substance and subsequently pour the substance into a large or small-mouthed container for storage and subsequent use.

It is a further object of the present invention to provide a kitchen utensil for scooping, scraping and collecting food substances for subsequent pouring or serving, and wherein the utensil provides for an indication of units of measurement of the collected substance.

It is yet a further object of the present invention to provide an improved kitchen utensil which includes a scoop portion and an elongate handle, and wherein the scoop portion includes a reservoir for holding a collected substance, one or more scraping edges, and a non-drip pour spout for pouring and/or serving the collected substance, thereby enabling the collected substance to be returned to a container, without spillage, for storage and subsequent use.

It is still a further object of the present invention to provide a kitchen utensil for scooping, scraping, measuring, pouring and serving various liquid and dry powder substances, and wherein the utensil includes a scoop portion with a flat bottom to enable the utensil to stand in an upright position when set down with the collected contents inside, thereby preventing spillage and allowing the user's hands to remain free and clean to perform other tasks.

It is still a further object of the present invention to provide the kitchen utensil, as set forth above, in a variety of sizes, according to units of measure, and wherein the smaller sized utensils are adapted to nest within larger sized utensils in a stacked array for ease of storage.

It is yet a further object of the present invention to provide a kitchen utensil, as set forth above, and wherein the handle and pour spout are arranged to accommodate both left-handed and right-handed users.

These and other objects and advantages of the present invention are more readily apparent with reference to the detailed description and the accompanying drawings.

SUMMARY OF THE INVENTION

The present invention is directed to a utensil for scooping, scraping, measuring, pouring and serving any of a variety of liquid or dry granular food substances The utensil includes a main body having a generally flat bottom and side walls extending up from the bottom to a top edge in surrounding relation to an interior reservoir. The top edge is preferably tapered in thickness to provide a scraping blade which generally conforms to and seals against the surface of a bowl, dish, pan or the like to thoroughly scrape and remove a substance therefrom. A pour spout formed with a non-drip lip extends from one of the side walls, along the top edge, and allows the scooped substance to be easily poured into a storage container without spilling the substance. A handle extends from the main body and, in a preferred embodiment, is offset towards the side wall having the pour spout to reduce the likelihood of contact of the user's fingers with the substance when the top edge opposite of the spout is used to scrape and scoop the substance. The device may be made to include a range of sizes, according to units of measure, with smaller utensils nesting within larger ones in a stacked array for storage purposes.

BRIEF DESCRIPTION OF THE DRAWINGS

For a fuller understanding of the nature of the present invention, reference should be made to the following detailed description taken in conjunction with the accompanying drawings in which:

FIG. 1 is a top perspective view, partially exploded, showing four utensils of the present invention of varying size and arranged in a stacked, nested array;

FIG. 2 is a cross-sectional view taken along the line indicated as 2—2 in FIG. 2;

FIG. 3 is an isolated cross-sectional view taken along the line indicated as 3—3 in FIG. 2;

FIG. 4 is an isolated sectional view taken along the line indicated as 4—4 in FIG. 3;

FIG. 5 is an isolated cross-sectional view taken along the line indicated as 5—5 in FIG. 1;

Like reference numerals refer to like parts throughout the several views of the drawings.

DETAILED DESCRIPTION OF THE PREFERRED EMBODIMENTS

Figure 6:
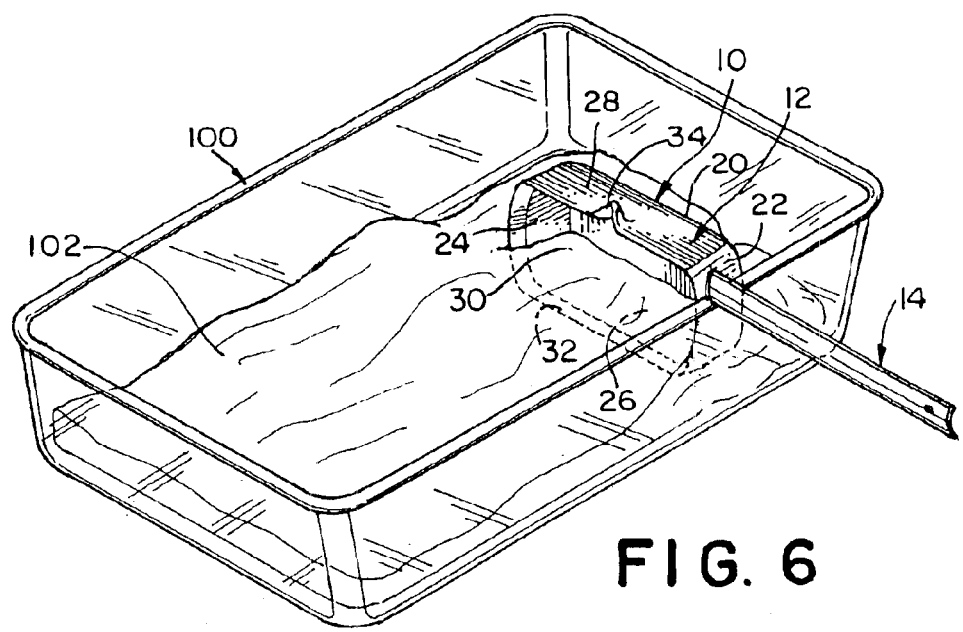
FIG. 6 is a top perspective view showing the utensil in use to scoop a liquid substance from a shallow pan.

Referring to the several views of the drawings, and initially FIGS. 1 and 2, the utensil of the present invention is shown and is generally indicated as 10. The utensil 10 is specifically structured to facilitate ease of scooping, scraping, measuring, pouring and serving various food substances, including liquids, syrups, batter and dry granular foods (e.g. flour, sugar, ground coffee, etc.)

As seen in FIGS. 1 and 2, the utensil 10 is preferably provided in a range of sizes, allowing smaller ones of the utensil to be nested within larger ones in a stacked array 16. Each one of the utensils 10 includes a main body 12, defining a scoop portion, and an elongate handle 14 extending from an end of the main body 12. The main body 12 is formed and configured to include a flat bottom 20, a proximal end wall 22, a distal end wall 24, a first side wall 26 and an opposite side wall 28. In a preferred embodiment, the bottom and the walls of the main body are arranged to define a generally rectangular configuration surrounding an interior reservoir 30 for holding food substances which have been scooped from a pan, dish, bowl or other container.

A top edge 32 extends along at least the distal end wall 24 and the first side wall 26 and is tapered to provide a scraping blade. In a preferred embodiment, the walls and bottom of the main body are formed of a firm yet flexible material, such as a rubberized plastic, which allows the walls to flex and conform to a surface configuration upon application of an external force. More specifically, the scraping blade of the top edge 32 is specifically structured and disposed to conform to the surface contour of a pan, bowl, dish or other container, in a manner similar to a rubber wiper blade used for removing water from a glass surface. Accordingly the top edge 32 along the distal end wall 24 and the first side wall 26 is able to conform to the general surface configuration of a bowl, dish, pan, etc. in order to effectively scrape and remove any of various food substances therefrom, as further illustrated in FIGS. 6–8 and 10–11.

Figure 9:
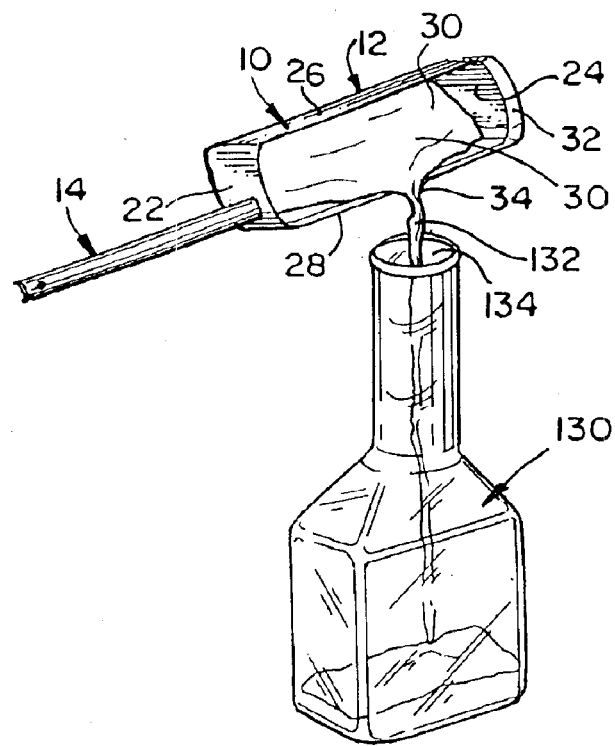
FIG. 9 is a top perspective view showing the utensil pouring a collected substance through the narrow open mouth of a storage container.

A pour spout 34 is formed along the top edge of the second side wall 28, opposite the first side wall 26. The pour spout 34 is specifically structured and disposed to direct the food substance held in the main body into a narrow stream of flow, thereby allowing the food substance to be easily poured into a container, such as a small mouth container 130, as depicted in FIG. 9. The pour spout 34 is formed to include a non-drip lip 36, as best illustrated in FIGS. 3 and 5.

Figure 10:
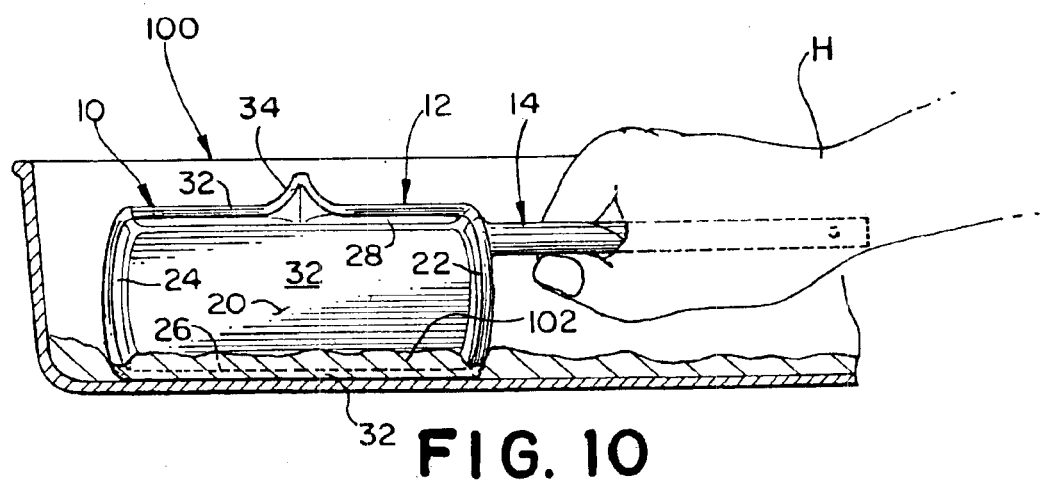
FIG. 10 is an isolated cross-sectional view of a roasting pan showing use of the utensil to scoop a substance from a bottom of the roasting pas.

The elongate handle 14 extends from the proximal end wall 22 and is preferably offset towards the second side wall 28 which has the pour spout 34. This offset arrangement allows the scraping blade 32 of the first side wall 26 to scrape along the bottom or side surfaces of a pan, dish, bowl etc. while maintaining the user's hand H free of contact with food substance being scraped and scooped, as illustrated in FIG. 10. In a preferred embodiment, the elongate handle 14 is provided with a top rounded surface 40 and a concave bottom surface 42 for ease of grasping and stacking of the plurality of utensils, as shown in FIGS. 1 and 2. A hole 44 may be formed through the elongate handle 14, near the distal end, to facilitate hanging of the utensil 10 on a hook.

Throughout FIGS. 6–11, various examples of use of the utensil 10 are illustrated. More specifically, the utensil 10 is shown in use to scrape various substances from a variety of container styles and shapes, with the utensil being held in either a horizontal position or a vertical, upright position.

In FIG. 6, the utensil 10 is shown in use to scrape and scoop a liquid or semi-liquid substance (e.g. gravy, sauce, batter, etc.) from a shallow baking dish. As shown, the utensil 10 is held in a generally horizontal position with the scraping blade 32 on the first side wall 26 maintained against the bottom surface of the shallow baking pan 100 so that the food substance 102 is scraped and scooped into the interior reservoir 20 of the scoop main body 12.

Figure 7:
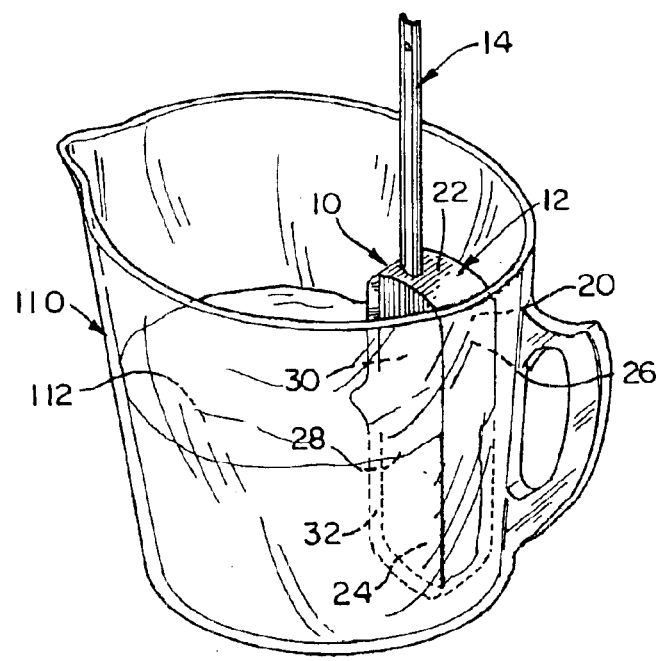
FIG. 7 is a top perspective view showing use of the utensil of the present invention used in a vertical orientation to scoop a substance from a deep container.

FIG. 7 illustrates an example of the utensil 10 used to scoop a liquid substance 112 from a tall container or pitcher 110. In this particular embodiment, the utensil 10 is held in a vertical, upright position with both the distal end wall 24 and first side wall 26 engaging the inner surfaces of the tall container 112 as the utensil 10 is moved around the interior side wall surface of the container 112 in a generally circular direction of travel. More specifically, the scraping blade 32 on the distal end wall 24 is maintained in contact with the interior bottom surface of the container 112 and the scraping blade 32 on the first side wall 26 is maintained in engagement with the inner side wall surface of the container 112 as the utensil 10 is moved in the scooping action, as described above and illustrated in FIG. 7.

Figure 8:
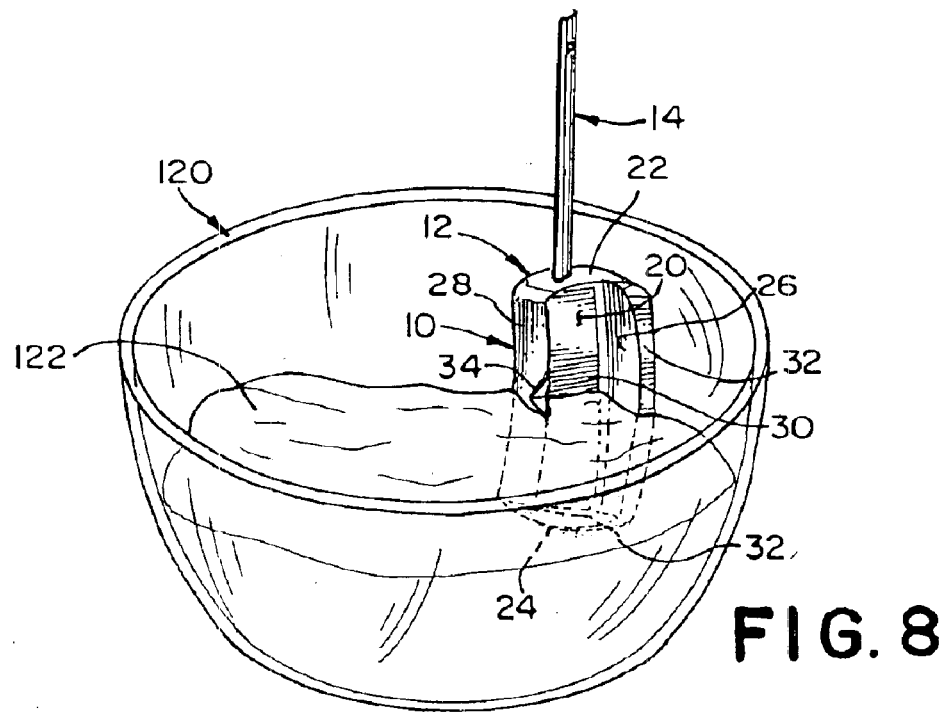
FIG. 8 is a top perspective view showing use of the utensil to scoop a substance from a bowl.

FIG. 8 shows the utensil 10 used to scoop a liquid, semi-liquid or a powder substance 122 from a mixing bowl 120. Similar to the example of FIG. 7, the substance 122 in the mixing bowl 120 is scooped while holding the utensil in vertical, upright position with the scraping blade 32 on the distal end wall 24 and first side wall 26 maintained in contact with the interior surfaces of the mixing bowl 120.

In FIG. 9, an example of use of the utensil to pour a substance through a narrow opening 134 of a small mouth bottle 130 is shown. In this particular example a condiment 132, such as salad dressing is shown poured into a small mouth bottle 130 having an elongate neck with a small, narrow opening 134. This example illustrates the function of the pour spout 34 which is structured to direct the food substance 132 in a narrow, highly directed stream for conveniently refilling a container 130 without spilling the food substance 132 down the outer side surfaces of the container 130.

Figure 11:
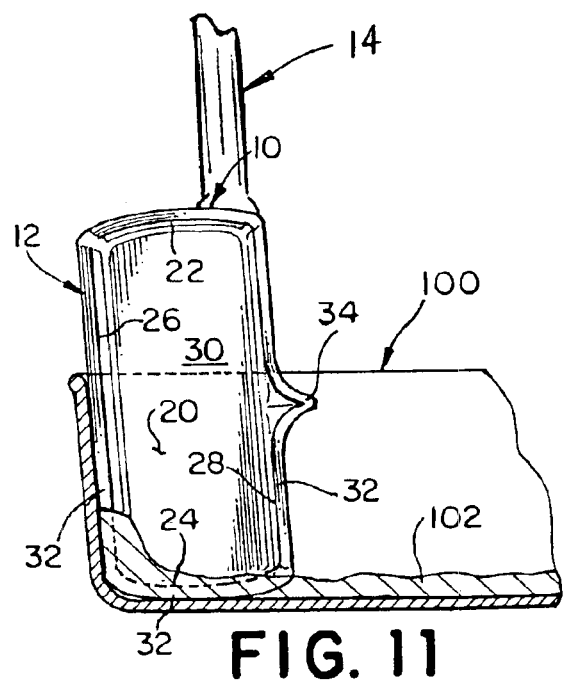
FIG. 11 is an isolated cross-sectional view of the roasting pan of FIG. 10 showing use of the utensil to scoop the substance along the inner side edges and bottom of the roasting pan while the utensil is held in a vertical, upright position.

FIGS. 10 and 11 illustrate use of the utensil to scrape a food substance 102, such as fat drippings or gravy from a large roasting pan 100. In FIG. 10, the utensil 10 is shown held in a horizontal position so that the scraping blade 32 on the first side wall 26 is maintained in scraping contact of the roasting pan 100 as the scoop body is moved in a linear motion along the bottom surface of the pan 100. This particular example demonstrates the usefulness of the offset handle 14 which maintains the user's hand and fingers H free from contact with the food substance 102 as the utensil 10 is held in a horizontal position to scoop the food substance 102 from the bottom of the pan 100.

In FIG. 11, the utensil 10 is held in a upright position to scrape the food substance from the side bottom corners of the pan 100. As shown in FIG. 11, when held in this position, the scraping blade 32 on both the first side wall 26 and the distal end wall 24 are maintained in contact with the inner side and bottom surfaces of the roasting pan 100 to effectively scrape and scoop the food substance 102 along the interior edges, corners sides and bottom of the roasting pan.

While the present invention has been shown and described in accordance with preferred and practical embodiments thereof, it is recognized that departures from the instant disclosure are contemplated when the spirit and scope of the present invention which are not limited except as set forth in the following claims as interpretive in the doctrine of equivalents.

What is claimed is:

1. A utensil set comprising:

a plurality of utensils each comprising:

a main body formed of a flexible, resilient material, said main body defining a scoop and including a bottom and a plurality of walls extending upwardly from said bottom to a top edge surrounding an open top of said scoop, said plurality of walls including a proximal end wall, a distal end wall opposite from said proximal end wall, a first side wall and a second side wall opposite from said first side wall, said plurality of walls and said bottom being formed and configured to surround a reservoir for holding a pourable substance therein;

a scraping blade formed along at least a portion of said top edge;

a spout extending from said second side wall, along said top edge, and communicating with said reservoir, said spout being structured and disposed for directing the pourable substance into a narrow stream of flow when pouring the pourable substance from said reservoir;

an elongate handle extending from said wall structure of said main body;

said scraping blade and said walls of said main body being flexible to allow said scraping blade to conform to surfaces being scraped by said scraping blade using manually applied pressure while grasping said elongate handle;

said plurality of utensils each having a different size reservoir according to a specific unit of volume measurement; and said plurality of utensils being structured and disposed to be stacked in nested, ordered arrangement from a smallest size reservoir to a largest size reservoir.

2. The utensil set as recited in claim 1 wherein said spout is formed to include a non-drip lip.

3. The utensil set as recited in claim 2 wherein said spout is formed along said second sidewall.

4. The utensil set as recited in claim 3 wherein said elongate handle is offset towards said second sidewall.

5. The utensil set as recited in claim 1 wherein said bottom is flat.

6. The utensil set as recited in claim 1 wherein said main body and said elongate handle are integrally formed of said flexible, resilient material.

* * * * *